United States Patent Office 2,766,852
Patented Oct. 16, 1956

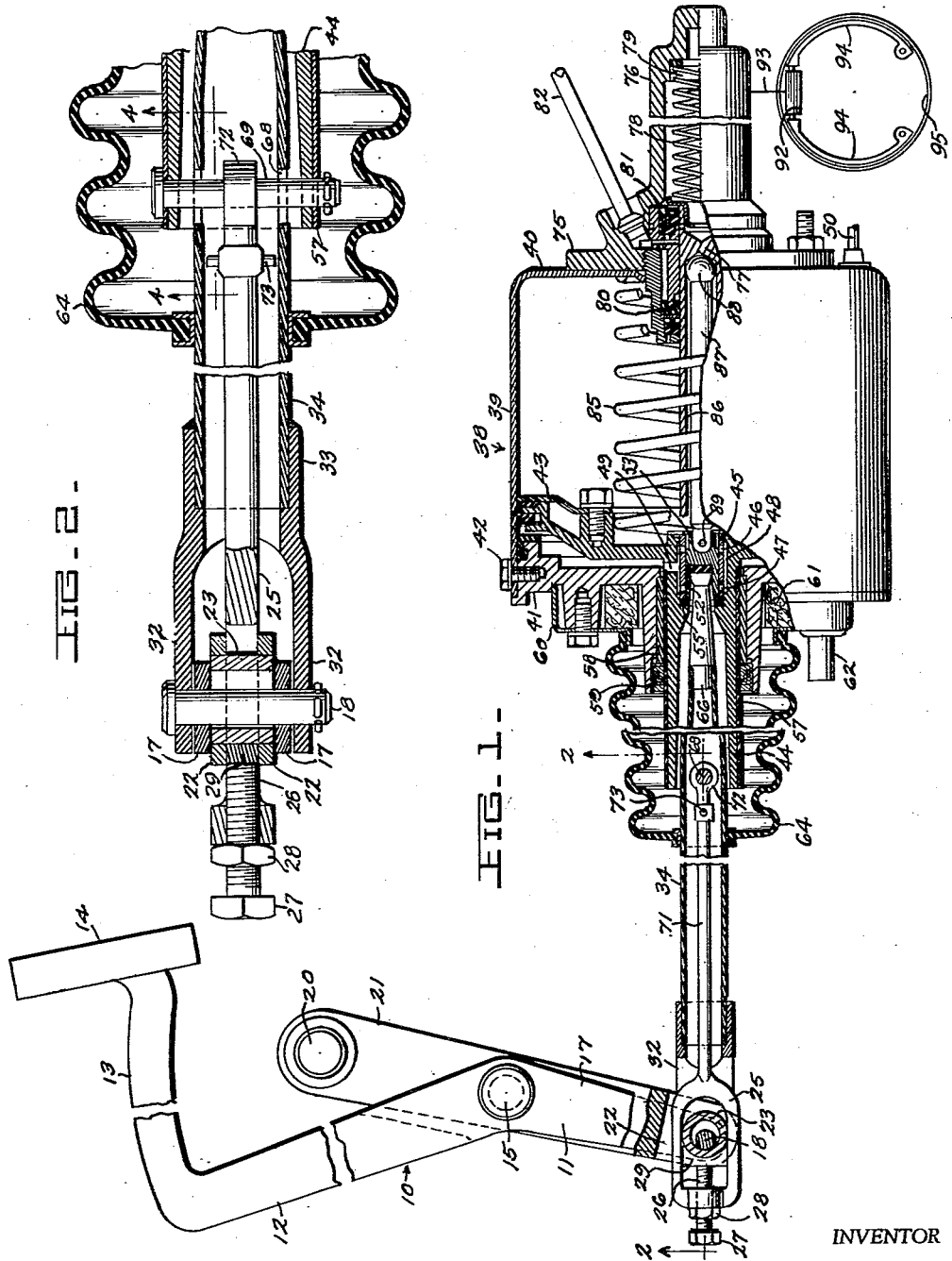

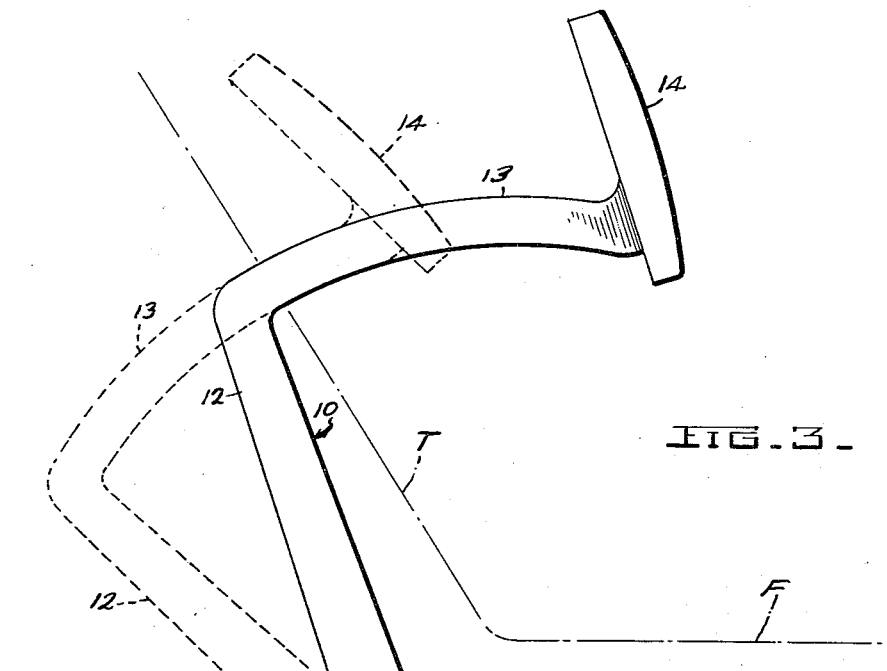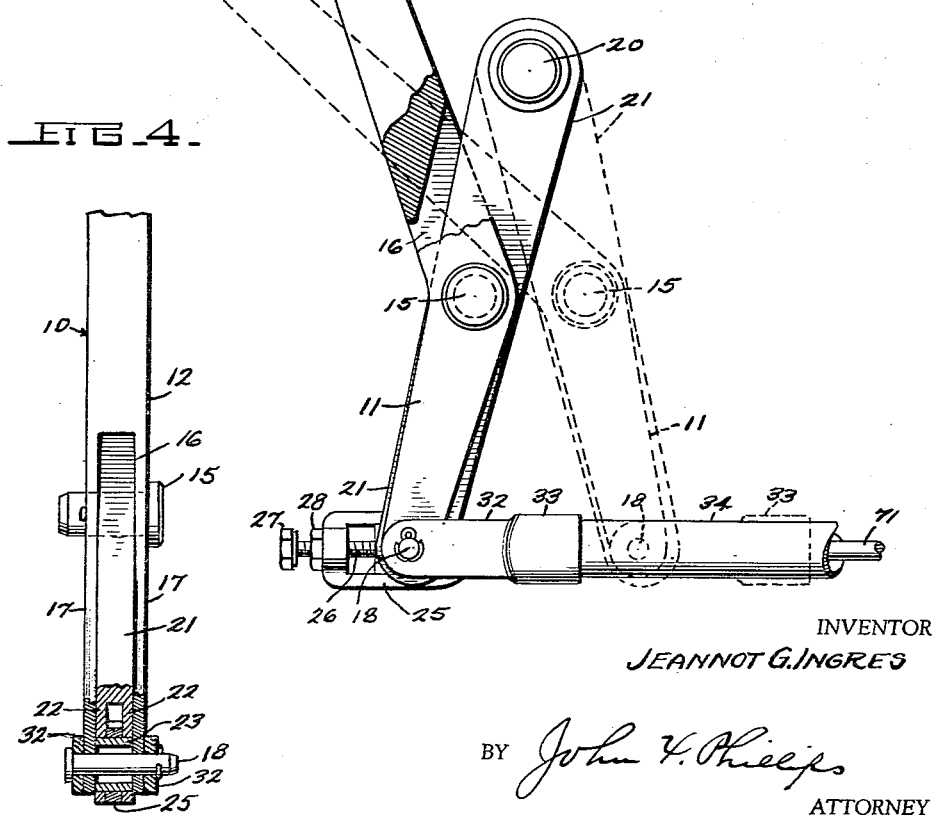

2,766,852

BRAKE OPERATING MECHANISM

Jeannot G. Ingres, Dearborn, Mich., assignor to Kelsey-Hayes Wheel Company, Detroit, Mich., a corporation of Delaware Application August 3, 1953, Serial No. 371,889

20 Claims. (Cl. 188—152)

This invention relates to a brake operating mechanism and more particularly to novel means for controlling the movement of a brake pedal lever during operation of the latter for displacing fluid from a master cylinder.

There are several highly desirable characteristics which should be embodied in the brake operating mechanisms for motor vehicles. For example, conventional mechanisms of this type, without booster motors, conventionally employ a relatively high brake pedal in order to provide the necessary leverage for moving the master cylinder plunger to displace fluid therefrom, and it would be more advantageous to place the pedal pad of the lever in a relatively low position to minimize pedal pad travel and to facilitate the transferring of the driver's foot from the accelerator pedal to the brake pedal. The use of a relatively low pedal pad has been rendered feasible by the use of booster mechanisms wherein a booster motor performs a substantial part of the work in applying the brakes, thus permitting the lowering of the pedal pad because of the reduced work which must be performed by the operator.

In such booster mechanisms it has become the desire of the industry to provide what is termed as a "soft" pedal or treadle, that is a mechanism wherein initial movement of the pedal pad is adapted to take place without the substantial resistance which is present when the pedal has direct mechanical connection with the master cylinder plunger, such a mechanism requiring much greater force for initially displacing fluid from the master cylinder than is true of conventional brake pedals having greater lever ratios. This disadvantage has been overcome with improved booster mechanisms wherein initial movement of the pedal pad does not transmit movement to the master cylinder plunger. It is further desirable in any brake system of this character to provide the brake pedal with a highly accurate degree of "feel" such as is present in conventional pedal-operated master cylinder plungers.

An important object of the present invention is to provide a novel arrangement which permits the use of a brake pedal having more or less conventional lever ratios whereby the lower end of the brake pedal directly transmits its movement to the piston or plunger of the master cylinder while still allowing the provision of a relatively low pedal pad.

A further object is to provide such an arrangement wherein the relatively great leverage provided in the brake pedal is permitted by virtue of a novel arrangement whereby the pivot of the brake pedal is power-shifted throughout brake operation, thus maintaining the normal relatively high lever ratio in the brake pedal while at the same time minimizing the total travel of the pedal pad and permitting the use of a relatively low pedal or treadle.

A further object is to provide such an apparatus wherein the direct connection employed between the brake lever and the fluid displacing plunger of the master cylinder is such that there is a constant direct and uniform hydraulic reaction transmitted to the brake pedal at all times, thus providing a highly accurate degree of "feel" in the brake pedal.

A further object is to provide novel means for supporting the brake pedal for rocking movement on a pivot which provides the brake pedal with conventional leverage, and to provide power means for shifting such pivot to tend bodily to move the brake pedal, thus minimizing the travel of the pedal pad.

Other objects and advantages of the invention will become apparent during the course of the following description.

In the drawings I have shown one embodiment of the invention. In this showing:

Figure 1 is a side elevation of a brake operating mechanism embodying the invention, parts being broken away and parts being shown in section;

Figure 2 is an enlarged fragmentary sectional view on line 2—2 of Figure 1;

Figure 3 is an enlarged side elevation of the lever system for operating the booster brake, parts being shown in section; and Figure 4 is a fragmentary end elevation of the same, parts being shown in section.

Referring particularly to Figures 1 and 3 the numeral 10 designates a brake pedal lever as a whole comprising a lower arm 11 and an upper arm 12, the upper portion of which extends rearwardly and upwardly as at 13 and is provided at its rear extremity with a conventional pedal pad 14. The pedal lever 10 is supported intermediate its ends by a pivot pin 15, supported in the manner described below. The pedal lever 10 is bifurcated at its lower end as at 16 to provide a pair of depending parallel arms 17 between the lower ends of which is connected a pin 18 (Figures 1 and 4).

To any suitable stationary part of the vehicle is connected a bracket (not shown) supporting a stub shaft 20 carrying a generally depending lever arm 21 adapted to swing forwardly and rearwardly on the axis of the shaft 20. The pivot pin 15 is carried by the lever arm 21 intermediate the ends thereof. As shown in Figures 3 and 4, the bifurcation 16 of the brake pedal extends upwardly substantially above the pivot pin 15 to provide for the reception between the arms 17 of the lower end portion of the lever arm 21 as clearly shown in Figures 3 and 4. The lower end of the lever arm 21 is bifurcated to provide a pair of arms 22 (Figure 4) and through these arms extends a tubular thimble 23 through which extends the pin 18, the thimble 23 being of substantially larger diameter than the pin 18 to permit relative movement of these parts for a reason which will become apparent.

Referring to Figures 1 and 4, it will be noted that a closed yoke 25 extends between the arms 22 of the lower end of the lever 21 and the tubular thimble 23 projects through the slot in the yoke 25 and through the arms 22 to be mechanically connected to the lower end of the lever arm 21. The closed forward end of the yoke 25 carries an adjusting screw 26 having a head 27 at its forward end and provided with a jam nut 28. The rear end of the screw 26 contacts with a bearing block 29 arranged between the arms 22 and engaging the thimble 23. It will become apparent that the screw 26 provides an adjusting means for changing the relative positions of the lever 10 and lever arm 21 to provide for the desired adjustment of the parts.

A pair of yoke arms 32 (Figure 2) straddle the lower lever ends 17 and the pin 18 passes through these yoke arms. Rearwardly of the lower ends of the levers 10 and 21, the yoke arms 32 are connected by a sleeve 33 in which is fixed the forward end of a tube 34 which may be welded thereto.

Referring to Figure 1, the numeral 38 designates a motor mechanism as a whole comprising a cylinder 39 one end of which is closed as at 40 and the other end of which is provided with a cast head 41 secured in position as at 42. A piston indicated as a whole by the numeral 43 is reciprocable in the cylinder 39 and carries a sleeve 44 extending through the head 41. A valve sleeve 45 is fixed in the piston body. This valve is provided with vacuum openings 46 and air openings 47, both of which communicate with an elongated groove 48 in the piston body. This groove is in fixed communication with the left-hand end of the cylinder 39 through a port 49, such end of the cylinder forming a variable pressure chamber. The other end of the motor forms a constant pressure chamber and is in fixed communication through pipe 50 with a source of vacuum.

A valve 52 is slidable in the sleeve 45 and has a reduced end 53 normally providing a space communicating between the vacuum end of a motor to the right of the piston 43 and with the vacuum ports 46, thus normally establishing communication between the ends of the motor cylinder when the motor is de-energized, to vacuum-suspend the piston 43. In the "off" positions of the parts, the valve 52 engages a resilient seal 55, thus preventing leakage from the interior of the sleeve extension 44 into the variable pressure chamber of the motor. As is well known, slight leakage is bound to occur through a valve of the sleeve and spool type as illustrated in Figure 1. This makes no difference during the normal operation of the mechanism but it is desirable to prevent any leakage in the "off" positions of the parts, hence the use of the resilient seal 55. It will become apparent that upon movement of the valve 52 toward the right, the reduced end 53 of the valve will pass out of communication with the ports 46 to disconnect the ends of the motor cylinder from each other, the left hand end of the valve 52 then uncovering the air ports 47 to admit air from the interior of the sleeve extension 44 into the variable pressure end of the motor.

The extension 44 is preferably surrounded by a stainless steel or other smooth type of sleeve 57 which operates directly in the bearing 58 and the latter is sealed against leakage in any suitable manner as at 59.

A shell 60 is fixed against the motor head 41 and houses an air cleaning element 61 to which air is admitted through a pipe 62. To the shell 60 is connected one end of a rubber of similar longitudinally collapsible boot 64, the other end of this boot being connected to the sleeve 34 previously described, as shown in Figure 2. The sleeve 34, within the extension 44, is tapered to reduce in diameter toward the interior of the motor and at its inner end is connected to a rod 66 the inner extremity of which seats in the valve 52 to impart movement thereto upon movement of the sleeve 34 to the right in a manner to be described.

Referring to Figures 1 and 2 it will be noted that the sleeve 34, just within the free end of the extension 44, is longitudinally slotted as at 68 for the passage therethrough of a transverse pin 69 the ends of which are connected to the sleeve extension 44. It will be apparent, therefore, that the sleeve 34 and the piston 43, of which the extension 44 is a part, are adapted to partake of substantial movement relative to each other longitudinally of the motor.

The closed yoke 25 is fixed to one end of an axial rod 71 as shown in Figure 1, and the rear end of this rod is provided with a bearing 72 through which extends the pin 69, the rod 71 preferably carrying a centering pin 73 to limit lateral movement of the bearing 72 on the pin 69.

It will be apparent that the boot 64 prevents the entrance of air directly into the extension 44, this extension obviously having a substantial clearance around the sleeve 34. The admission of air into the motor, therefore, must take place through the pipe 62, air cleaner 61, the space within the boot 64, and thence through the interior of the extension 44 to be admitted into the variable pressure end of the motor in accordance with the relative positions of the valve 52 and sleeve 45.

At the opposite end of the motor is arranged and secured a casting 75 preferably carrying as an integral part thereof a conventional master cylinder 76. A plunger 77 is operable into the master cylinder to displace fluid therefrom and movement of this plunger is opposed by a spring 78 which serves also to engage and control a conventional residual pressure valve 79. The casting 75 is provided with suitable sealing means 80 surrounding the plunger 77 and a suitable sealing and hydraulic fluid admission assembly 81 is provided for sealing the plunger 77 and for controlling the admission of additional hydraulic fluid into the master cylinder through a pipe 82 leading from a suitable reservoir. The particular sealing and fluid replenishing means forms no part of the present invention.

As shown in Figure 1, a return spring 85 is arranged in the motor and engages at one end against the motor head 40 and at its opposite end against the body of the piston 43. The spring 85 accordingly tends to oppose movement of the piston 43 and provides means for returning this piston to the "off" position when the motor is de-energized. The plunger 77 includes a sleeve portion 86 extending through the spring 85 but terminating short of the valve device for the motor and accordingly the lattter does not impart any direct movement to the plunger 77. A motion transmitting rod 87 projects through the sleeve 86 and is provided at one end with a ball 88 seating within the end of the sleeve portion of the plunger 77, the opposite end of the rod 87 being pinned as at 89 to the valve 52.

Hydraulic pressure in the master cylinder 76 is utilized in the conventional way for applying the vehicle brakes. Only one of the brakes has been shown in Figure 1 for the purpose of illustration. Such brake utilizes a conventional wheel cylinder 92 connected by a line 93 to the master cylinder 76. The wheel cylinder is operable for expanding brake shoes 94 into engagement with a conventional brake drum 95.

*Operation*

The parts normally occupy the positions shown in Figure 1, the motor 38 being de-energized and being vacuum-suspended in accordance with the operation of the control valve 52 in the manner stated above. When it is desired to operate the brake, the operator will depress or push forwardly on the brake pad 14. The lever 10 will then pivot about the axis of the pin 15, this pin remaining stationary until the "cut-in" point is reached, that is, the point at which energization of the vacuum motor commences. It will be noted that the pin 18 (Figures 1 and 2) lies near the left hand extremity of the interior of the thimble sleeve 23 in the initial positions of the parts. When the pedal pad is depressed, the lower end 11 of the pedal lever moves toward the right in Figure 1, carrying with it the yoke arms and sleeve 32, 33, thus moving the sleeve 34 toward the right and operating the spool valve 52. As previously stated, the left hand end of this valve in Figure 1 engages the seal 55 when the parts are in the off position, thus preventing any leakage of air into the motor.

Initial movement of the valve 52 takes it out of engagement with the seal 55 and the left hand limit of the annular cutout 53 moves across and closes the vacuum openings 46 in the valve sleeve. This disconnects the right hand side of the motor from the variable pressure side thereof, but of course the right hand motor chamber remains in communication with the source of vacuum. Slight further movement of the valve 52 causes the left hand end thereof to move past the left hand limits of the openings 47, thus cracking these openings to the atmosphere. Air flows through the air cleaner 61, through the interior of the boot 64, thence through the sleeve 44, openings 47, annular passage 48 and port 49 into the variable pressure chamber of the motor. The piston 43 now starts to move toward the right.

It will be apparent that upon initial movement of the brake pedal, the pin 18 will have moved away from proximity to the left hand side of the thimble sleeve 23. Therefore, when the piston 43 starts to move, there will be considerable play between the thimble sleeve 23 and the pin 18 and these parts will not engage with each other. Initial movement of the brake pedal will have moved not only the valve 52 toward the right in the manner described, but also will have actuated the push rod 87 to move the plunger 77 and start a displacement of fluid from the master cylinder. This operation takes place with no assistance from the motor since there will be no positive connection between the motor and the plunger 77.

In this connection it is particularly noted that the pivot point 15 in the present instance is so designed as to provide a lever ratio in the pedal lever of 3.327 to 1. This is comparable to the ratio provided in conventional brake pedals without booster motors, and because of the relatively great lever ratio, only one and three-quarters pounds (approximately) is required to move the valve 52 to the motor "cut-in" point, while the required pedal travel is approximately .1497". As previously stated, a "soft" pedal operation is desirable when the pedal is initially operated and this is possible in the present construction because of the lever ratio referred to, it being unnecessary to provide any lost motion between the pedal operated parts and the plunger of the master cylinder. Therefore, there is a direct "push through" from the pedal to the master cylinder plunger. It is particularly noted that the present invention renders such an arrangement practicable, but it is to be understood that the invention as further referred to below is not limited in its use to any particular type of fluid pressure motor or any particular type of means for conveying movement between the pedal and the plunger of the master cylinder.

At this point it might be noted also that with the ratio of the pedal pad movement to movement of the valve, if the pivot pin 15 were stationary, a pedal pad travel of approximately 8.998" would be required to produce a 3" output stroke in the master cylinder. Such a stroke would be prohibitive in the pedal pad, and yet the substantial lever ratio is advantageous to provide a soft pedal with direct reaction of the hydraulic fluid from the master cylinder through the mechanical connections leading back to the brake pedal.

In the present instance, the pivot pin 15 remains stationary until the motor "cut-in" point is reached in the manner described above. As soon as the piston 43 starts to travel toward the right, its movement will be transmitted through the sleeve extension 44, pin 69, rod 71 and yoke 25 to the lower end of the lever arm 21, motion being transmitted from the yoke 25 to the lever arm through the adjusting screw 26, bearing block 29, and thimble 23. Accordingly, swinging movement of the lever arm 21 in a counterclockwise direction will begin and the pivot pin 15 will be moved from the solid line position shown in Figures 1 and 3 toward the dotted line position shown in Figure 3. This provides a tendency to bodily move the brake lever 10 toward the right. The floor board of the vehicle has been generally indicated by the broken line F in Figure 3 and the toe board by the broken line T. It will be noted that the off position of the pedal pad is relatively low and in traveling to its limit of movement it will go to the dotted line position shown in Figure 3, which represents a total pedal pad movement in the present installation of approximately 3¾" to produce a master cylinder plunger stroke of 3", which, as stated above, is the approximate stroke which would require a pedal pad travel of approximately 9.98" if the pivot point 15 were held stationary. The vacuum motor accordingly is utilized to effect bodily movement of the pedal lever and this movement takes place progressively in a follow-up action, due to the valve action, as the pedal pad is progressively depressed. The lever ratio, however, remains constant since the pedal lever 10 always pivots about the pivot pin 15. Thus it will be apparent that the present invention provides all of the advantages of a substantial lever ratio in the brake pedal without the disadvantage of requiring a long pedal pad travel. This travel may be very much shortened and yet a soft pedal is provided with an accurate direct reaction of the hydraulic fluid in the master cylinder, this reaction being transmitted through rod 87, valve 52, rod 66, sleeve 34 and pin 18 which is carried by the lower end of the brake pedal. Thus the brake pedal, in effect, operates in exactly the same manner as a conventional brake pedal without a booster mechanism, except as the motor mechanism performs the function of moving the pivot 15 of the lever arm 21.

From the foregoing it will be apparent that the ratio provided in the lever 10 permits the operator to exert all of the force necessary to provide high braking pressures. As a matter of fact, the lever ratio is greater than that in conventional constructions, thus eliminating the necessity for providing power booster operation for assisting in generating hydraulic pressures. At the same time, the shifting of the pivot 15 very much limits the pedal travel, thus making it wholly practicable to provide for full pedal operation of the brakes while limiting the movement of the pedal pad in the same manner as many boosters now provide. As stated, a 9.1 to 1 "feel" ratio exists between the hydraulic line pressure and the pedal force. That is, fifty-five pounds of pedal pressure will produce five hundred p. s. i. line pressure. This reaction effect is constant throughout the operating range of the brake and is transmitted by swinging of the brake pedal about the pivot point 15. The motor 38 in the present instance performs no other function than to "bodily" move the brake lever to provide the advantageous results referred to, namely, very high hydraulic pressures, pedal-generated without the use of a long stroke pedal.

The present construction is not liable to faulty operation in any respect, but of course there is a very remote possibility that the vacuum line somehow might be broken. If this should occur, it is possible for the operator to manually operate the brakes without assistance from the motor in shifting the pivot point 15. In the event of a failure of power in the motor, depression of the brake pedal will cause the pin 18 to move to its right hand limit of movement within the sleeve or thimble 23, and further movement of the brake pedal will then cause the levers 10 and 21 to move as a unit, swinging about the axis of the shaft 20. This will provide a lever ratio of approximately 1.25 to 1, which will require substantial force by the operator in applying the brakes, but it at least provides some means whereby the brakes may be applied to bring the vehicle to a stop.

It is well known that no "feel" reaction in a power brake pedal can quite equal for accuracy the feel provided in a manually operated brake. In the present construction, the entire brake operation is accomplished manually with a substantial lever ratio which permits full brake application without the exertion of very great force by the operator, and eliminates the motor and any possible fluctuations in its power, from affecting the feel transmitted through the brake pedal to the operator's foot. At the same time, while providing perfect accuracy in feel, the operator is enabled to effect full brake application with much less force than is required with conventional braking systems not provided with booster motors.

As previously stated, the particular type of booster motor is not of great importance in the invention and any kind of a booster may be employed with any type of valve mechanism for controlling its energization. It merely is necessary to provide a motor having a follow up control so that the pivot point 15 will be moved progressively in a follow up action as the brake pedal is depressed.

The releasing of the brake pedal obviously returns the parts to normal position. The return spring 85 exerts force on the piston 43 tending to return it to normal position, and the spring 78 and hydraulic pressure acting on the plunger 77 will move the rod 87 toward the left together with the valve 52 as pressure is released from the pedal pad. Accordingly, the valve cutaway 53 will again register with the vacuum openings 46 while the air openings 47 will be closed and the motor will be vacuum-suspended with no differential pressures tending to move the piston 43 toward the left. The return springs accordingly will return all of the parts to normal positions.

The construction shown is intended to be illustrative and not definitive, and the scope of the invention is defined in the appended claims.

I claim:

1. A brake mechanism comprising a lever, a pivotal support for said lever intermediate the ends thereof dividing it into a pair of arms one of which is a pedal arm and the other of which is a brake-applying arm movable in one direction upon the application of manual force to said pedal arm, power means connected to said pivotal support and energizable to effect movement thereof in said one direction, and means connected to said lever and operable when manual force is applied to said pedal arm to rock said lever, for energizing said power means.

2. A brake mechanism comprising a lever, a pivotal support for said lever intermediate the ends thereof dividing it into a pair of arms one of which is a pedal arm and the other of which is a brake-applying arm movable in one direction upon the application of manual force to said pedal arm, a differential fluid pressure operated motor having mechanical connection with said pivotal support, and means having mechanical connection with said lever and operable upon movement of said brake-applying arm in said direction for energizing said motor to move said pivotal support in the same direction.

3. A brake mechanism comprising a lever, a pivotal support for said lever intermediate the ends thereof dividing it into a pair of arms one of which is a pedal arm and the other of which is a brake-applying arm movable in one direction upon the application of manual force to said pedal arm, a second lever pivoted on a predetermined axis spaced from said pivotal support and carrying said pivotal support, a power device connected to said second lever, and means having mechanical connection with and operable upon rocking movement of said first named lever for energizing said power device to swing said second lever to move said pivotal support in said direction.

4. A brake mechanism comprising a lever, a pivotal support for said lever intermediate the ends thereof dividing it into a pair of arms one of which is a pedal arm and the other of which is a brake-applying arm movable in one direction upon the application of manual force to said pedal arm, a second lever pivoted on a predetermined axis spaced from said pivotal support and carrying said pivotal support, a differential fluid pressure operated motor having mechanical connection with said second lever, and a follow-up control valve mechanism for said motor having mechanical connection with said brake-applying arm whereby, upon movement of said brake-applying arm in said direction, said motor will be energized to swing said second lever and move said pivotal support in said direction but to a lesser degree.

5. A brake mechanism comprising a supporting lever mounted to turn on a fixed axis at one end, a pivot pin carried by said supporting lever intermediate its ends, a second lever pivoted intermediate its ends on said pivot pin and forming a pair of lever arms one of which is a brake-applying arm and the other of which is a pedal arm movable to rock said brake-applying arm in one direction, a power device having mechanical connection with the other end of said supporting lever, and means having mechanical connection with said second lever and operable upon movement of said brake-applying arm in said direction for energizing said power device to swing said first lever about its pivot axis and move said pivot pin in said direction.

6. A brake mechanism comprising a supporting lever mounted to turn on a fixed axis at one end, a pivot pin carried by said supporting lever intermediate its ends, a second lever pivoted intermediate its ends on said pivot pin and forming a pair of lever arms one of which is a brake-applying arm and the other of which is a pedal arm movable to rock said brake-applying arm in one direction, a differential fluid pressure operated motor having mechanical connection with the other end of said supporting lever, and a follow-up control valve having mechanical connection with the said brake-applying arm to energize said motor upon movement of the latter arm in said direction to swing said supporting lever about its pivot axis and move said pivot pin in said direction.

7. A brake mechanism comprising a rocking arm pivotally supported at its upper end for rocking movement on a fixed axis, a lever, a pivot pin carried by said rocking arm and pivotally supporting said lever intermediate the ends thereof, said lever above said pivot pin forming a brake pedal and forming below said pivot pin a brake-applying arm, a differential fluid pressure operated motor having a pressure responsive unit therein, a follow-up control valve mechanism for said motor comprising coacting valve units one of which is carried by said pressure responsive unit and the other of which is mechanically connected to said brake-applying arm, and means mechanically connecting said pressure responsive unit to said rocking arm whereby, when said brake-applying arm moves in a brake-applying direction, said motor will be energized and said other end of said rocking arm will be moved to rock such arm and move said pivot pin in said direction.

8. A brake mechanism comprising a rocking arm pivotally supported at its upper end for rocking movement on a fixed axis, a lever, a pivot pin carried by said rocking arm and pivotally supporting said lever intermediate the ends thereof, said lever above said pivot pin forming a brake pedal and forming below said pivot pin a brake-applying arm, a differential fluid pressure operated motor having a pressure responsive unit therein, a follow-up control valve mechanism for said motor comprising coacting valve units one of which is carried by said pressure responsive unit and the other of which is mechanically connected to said brake-applying arm, a master cylinder, a plunger therein having mechanical connection with said other valve unit whereby movement of said brake-applying arm will manually displace fluid from said master cylinder, and means mechanically connecting said pressure responsive unit to the other end of said rocking arm to rock the latter and move said pivot pin in the direction of brake-applying movement of said brake-applying arm.

9. A brake mechanism comprising a rocking arm pivotally supported at its upper end for rocking movement on a fixed axis, a pivot pin carried by said rocking arm intermediate the ends thereof, a lever arranged in a plane parallel to said rocking arm and pivotally supported intermediate its ends by said pivot pin, the upper end of said lever forming a brake pedal and the lower end of said lever forming a brake-applying arm, a differential fluid pressure operated motor having a pressure responsive unit therein, a follow-up control valve mechanism for said motor comprising a pair of elements one carried by said pressure responsive unit, a pair of motion transmitting devices one of which is connected between said pressure responsive unit and said rocking arm and the other of which is connected between the other valve element and the lower end of said brake-applying arm, a master cylinder, a fluid displacing plunger therein, and means for directly transmitting movement of said other valve element to said plunger.

10. A brake mechanism in accordance with claim 9, wherein said motion transmitting devices are coaxially arranged.

11. A mechanism for operating the brakes of a vehicle, comprising a supporting lever pivotally supported at its upper end for rocking movement on a fixed axis, a pivot pin carried by said supporting lever intermediate its ends, a second lever adjacent said supporting lever and pivotally supported intermediate its ends on said pivot pin for swinging movement in a plane parallel to said supporting lever, said second lever having an upper end forming a brake pedal and a lower end which is a pedal arm and has its lower extremity arranged adjacent the lower extremity of said supporting lever, a differential fluid pressure operated motor, a pressure responsive unit in said motor, a follow-up valve device for said motor comprising a pair of valve elements one of which is carried by said pressure responsive unit, direct mechanical connections between the lower end of said second lever and the other of said valve elements whereby movement of said brake pedal moves said other valve element to energize said motor, means for utilizing said mechanical connections for applying the brakes, and means mechanically connecting said pressure responsive unit to the lower end of said supporting lever.

12. A mechanism in accordance with claim 11, wherein the means for utilizing movement of said mechanical connections for applying the brakes comprises a master cylinder, a plunger therein, and a rod connecting said plunger to said other valve element.

13. A mechanism in accordance with claim 11, provided with a lost motion connection between the lower ends of said levers whereby, upon a failure in power in said motor, the lower end of said second lever will effect movement of said supporting lever about its fixed pivot axis.

14. A mechanism for operating the brakes of a vehicle, comprising a rocking arm having an upper end mounted for rocking movement on a fixed axis, a pivot pin carried by said rocking arm intermediate the ends thereof, a lever arranged in a plane parallel to said rocking arm and pivotally supported intermediate its ends by said pivot pin, said lever having an upper end forming a brake pedal and a lower end forming a brake-applying arm, a differential fluid pressure operated motor having a pressure responsive unit therein, a first sleeve carried by said pressure responsive unit and projecting from one end of said motor toward the lower ends of said rocking arm and said lever, a follow-up control valve mechanism for said motor comprising a pair of valve elements one of which is carried by said pressure responsive unit, mechanical connections between the lower end of said brake-applying arm and the other valve element comprising a second sleeve coaxial with and arranged within said first sleeve and connected to the lower end of said brake-applying arm, a rod in said second sleeve having connection at one end with the lower end of said rocking arm, said second sleeve having a slot and said rod having a pin at the other end thereof projecting through said slot and connected to said first sleeve, and means for utilizing movement of said second sleeve for applying the brakes.

15. A mechanism in accordance with claim 14 provided with a lost motion connection between the lower ends of said rocking arm and said lever whereby, upon a failure in power in said motor, operation of said lever will swing said rocking arm about its fixed pivot axis.

16. A mechanism for operating the brakes of a vehicle, comprising a supporting lever pivotally supported at its upper end for rocking movement on a fixed axis, a pivot pin carried by said supporting lever intermediate its ends, a pedal lever adjacent said supporting lever and pivotally supported intermediate its ends on said pivot pin for swinging movement in a plane parallel to said supporting lever, said pedal lever having upper and lower ends the former of which is a pedal arm and the latter of which has its lower extremity arranged adjacent the lower extremity of said supporting lever, a differential fluid pressure operated motor having a pressure responsive unit therein, a hydraulic master cylinder in axial alinement with said motor, a plunger in said master cylinder, a direct mechanical connection between said pedal lever and said plunger, a follow-up valve device for said motor comprising a pair of valve elements one of which is carried by said pressure responsive unit and the other of which is carried by said mechanical connection, and means mechanically connecting said pressure responsive unit to the lower end of said supporting lever.

17. A mechanism according to claim 16 wherein said means mechanically connecting said pressure responsive unit to the lower end of said supporting lever comprises a lost motion device through which said pedal lever is initially movable from a normal off position independently of movement of said supporting lever.

18. A booster mechanism comprising a fluid motor having a pressure responsive unit therein movable to perform work, a power lever supported for turning movement on a fixed axis and having mechanical connection at a point spaced from such axis with said pressure responsive unit, a valve mechanism having fluid connection with said motor and sources of relatively high and low pressures and normally positioned to connect said motor to one of said sources to balance pressures on opposite sides of said pressure responsive unit, said valve mechanism being movable from normal position to connect said motor to the other source of pressure to move said pressure responsive unit, and an operating lever pivotally connected to and supported by said power lever at a point between said fixed axis and the point of connection of said power lever with said pressure responsive unit, said operating lever being connected to said valve mechanism.

19. A booster mechanism according to claim 18 wherein said valve mechanism is coaxial with said pressure responsive unit, said power lever and said operating lever being connected respectively to said pressure responsive unit and said valve mechanism coaxially of said pressure responsive unit.

20. A booster mechanism according to claim 18 wherein said valve mechanism is coaxial with said pressure responsive unit, said power lever and said operating lever being connected respectively to said pressure responsive unit and said valve mechanism coaxially of said pressure responsive unit, and lost motion connection between said operating lever and said power lever having a range during which said operating lever operates said valve mechanism to move it from said normal position and beyond which said operating lever transmits force to said power lever.

References Cited in the file of this patent

UNITED STATES PATENTS

| | | |
|---|---|---|
| 368,347 | Massey | Aug. 16, 1887 |
| 1,582,118 | Bragg et al. | Apr. 27, 1926 |
| 1,601,649 | Schaeffer | Sept. 28, 1926 |
| 2,037,867 | Wall | Apr. 21, 1936 |
| 2,265,546 | Price | Dec. 9, 1941 |